United States Patent Office 3,298,988
Patented Jan. 17, 1967

3,298,988
PROCESS FOR PREPARING AQUEOUS POLYVINYL ALCOHOL SOLUTION CONTAINING PENTAVALENT VANADIUM COMPOUND
Harold King Sinclair, Wilmington, Del., assignor to E. I. du Pont de Nemours and Company, Wilmington, Del., a corporation of Delaware
No Drawing. Filed June 11, 1964, Ser. No. 374,243
3 Claims. (Cl. 260—29.6)

This invention relates to polyvinyl alcohol compositions containing gelling agents, and also to methods for the controlled gelatin of aqueous polyvinyl alcohol solutions.

Many methods for gelling aqueous polyvinyl alcohol solutions are known in the art. Many of these prior art gelling agents generally act instantaneously. That is, these compounds crosslink polyvinyl alcohol immediately upon contact therewith. Such prior art gelling agents are satisfactory where such instantaneous reaction can be tolerated, for example, in the application of such a gelling agent to the surface of a preformed polyvinyl alcohol film.

However, in many instances it is desired to prepare an aqueous polyvinyl alcohol solution containing a gelling agent which solution remains fluid for a certain period of time (varying from at least a few seconds, to several minutes) without causing any significant amount of gelation, but which then, automatically, without any further treatment, rapidly gels. Moreover, there has been a long-recognized need for a gelling agent which the manufacturer of polyvinyl alcohol may add to the dry product, from which product the consumer can prepare a stable, fluid, nongelled aqueous solution which will gel after a desired time interval.

For example, recently polyvinyl alcohol has been shown to be very useful in the preparation of very light weight foams suitable as insulating, acoustical, and packaging materials. In the preparation of such foams, it is necessary to first prepare an aqueous polyvinyl alcohol solution containing a gelling agent which does not cause instantaneous gelatin. Next, the foam is generated from the solution, which is then flowed through a hose or pipe to the position or place of application, whereafter it is essential that the polyvinyl alcohol foam very quickly gel.

It will be recognized that the gelling agent must not cause any substantial gelation during the preparation of the polyvinyl alcohol solution or during the generation of foam. However, gelation must occur within seconds or at the most a few minutes after the foam is placed in final position. This is essential for at least one of four reasons: (1) to assure stability of foam structure regardless of how slowly drying occures, which may require several days or even weeks; (2) to prevent drainage of substantial quantites of liquid to lower levels; (3) to prevent soaking of the foam liquid into porous building materials such as plasterboard, wallboard, electrical wiring, insulation, etc. and/or (4) to permit the foam to be placed in a vertical or largely unconfined position without running or falling out. A rapid change in the foam from a substantially liquid state to a gelled state is particularly essential for the last-mentioned characteristic. If the change from liquid to gel is not fast, the foam will not only adversely soak such porous materials, but also may break down in part and lose proper bonding of the foam to the building walls. However, as stated above, the gelling should not be completed until after the foam has been generated and flowed or placed in position because a foam in the fully gelled state is not readily flowed through pipes, hoses, orifices, nozzles, etc. without damage to the cellular structure.

In contrast, a foam in which the liquid phase has not been gelled is readily hosed, piped, spread and flowed into position.

Consequently, the prior art gelling agents which cause instantaneous or uncontrollable gelation, cannot be used in such a method for foam preparation. Instead, it is necessary to use a method for controlled gelation. That is, a method whereby an aqueous polyvinyl alcohol solution containing a gelling agent which does not cause immediate gelation, but which causes rapid gelation after a desired time interval.

In other uses of aqueous polyvinyl alcohol solutions it is also desired to employ such controlled gelation methods. For example, in the application of coating compositions comprising aqueous polyvinyl alcohol solutions onto porous substrates such as paper or paperboard, it is desired to have a gelling agent incorporated into such composition which does not instantaneously gel the composition so that it may be conveniently applied onto the substrate but which will cause rapid gelation shortly thereafter to prevent the composition from soaking into the substrate.

An object of this invention is to provide an improved polyvinyl alcohol composition containing a gelling agent. A further object is to provide a composition comprising polyvinyl alcohol and a gelling agent precursor which will remain stable for extended periods of time without causing any significant crosslinking of the polyvinyl alcohol. Another object is to provide a composition comprising polyvinyl alcohol and such a gelling agent precursor, which composition can be formed into a stable fluid aqueous solution, but which solution automatically, without any further treatment, will rapidly gel after a desired time interval. An additional object is to provide an improved method for the gelation of aqueous polyvinyl alcohol solutions. Still another object is to provide an improved method for the controlled gelation of aqueous polyvinyl alcohol solutions whereby such a gelling agent is added to said solution which does not cause instantaneous gelation, but which automatically, without any further treatment, causes rapid gelation after a desired time interval.

These and other objects are fully attained by the present invention which provides the composition comprising polyvinyl alcohol and a vanadium compound wherein the vanadium has a valence state of +5; and also provides the process of gelling an aqueous polyvinyl alcohol solution comprising contacting in said solution at a pH of up to about 2, a solution-soluble vanadium compound wherein the valence state of the vanadium is +5, thereby obtaining a solution which remains fluid immediately after mixing, but which automatically, without any further treatment, rapidly gels after a time delay which can be controlled as explained hereinafter.

The term "polyvinyl alcohol" refers to the water-soluble products obtained by the complete or partial alcoholysis or hydrolysis of polyvinyl esters such as polyvinyl acetate. Complete alcoholysis or hydrolysis indicates that 99–100% of the ester groups of the polyvinyl ester have been replaced by hydroxyl groups. Partial alcoholysis or hydrolysis indicates that 50–99% of the ester groups have been replaced by hydroxyl groups. A preferred polyvinyl alcohol is the commercially available, high molecular weight, fully hydrolyzed grade, having a 4% aqueous solution viscosity of 55–65 centipoises.

In the practice of this invention, a composition comprising polyvinyl alcohol and a vanadium compound wherein the valence state of the vanadium is +5 (herein referred to as "the vanadium compound") is prepared by any convenient manner. The manufacturer of polyvinyl alcohol can dry blend the polyvinyl alcohol and starting vanadium compound, using suitable ordinary mixing equipment, and the resulting dry mixture will remain stable for extended periods of time. The ultimate user can take this mixture and prepare an aqueous solution thereof, and then adjust the pH to within the critical pH range to thereby gel the aqueous polyvinyl alcohol solution at a controlled rate. Alternately, an aqueous polyvinyl alcohol solution may be prepared first, and the vanadium compound may be then added thereafter in accordance with this invention.

It is critical to this invention that the vanadium compound be contacted in the aqueous polyvinyl alcohol solution at a pH of up to about 2 in order to obtain the desired time delayed controlled gelation. At a higher pH, that is on the order of about 3 or above, the vanadium compound does not crosslink polyvinyl alcohol, and hence, will not gel an aqueous polyvinyl alcohol solution.

Within the critical pH range (i.e., up to about pH of 2), the aqueous polyvinyl alcohol solution remains fluid immediately after mixing, but rapidly gels after a certain time delay. This gelation time delay is very effectively controlled by the manner in which the pH of the solution is adjusted. As indicated above, the vanadium compound may be added to the polyvinyl alcohol either before or after the aqueous solution is formed. To adjust the pH to within the critical range, an acid may be added to the aqueous solution at any convenient time. That is, an acid may be first added to the aqueous polyvinyl alcohol to which thereafter is added the vanadium compound; or, the vanadium compound may be prepared in an acid solution which is then added to the aqueous polyvinyl alcohol; or part of the requisite amount of acid necessary to reach the critical pH range may be first added to the aqueous polyvinyl alcohol solution with the remaining amount of acid being used to prepare a solution of the vanadium compound which is then added to the polyvinyl alcohol solution; or an aqueous solution of the polyvinyl alcohol and vanadium compound may be first prepared, to which is then added the acid. It will be noted that the gelation occurs considerably sooner when the acid is used to prepare a solution of the vanadium compound which is then added to the aqueous polyvinyl alcohol solution (on the order of 2 to 20 seconds), than when the acid is first added to the aqueous polyvinyl alcohol to which is thereafter added the vanadium compound (on the order of 1 to 5 minutes). Intermediate time delays may be obtained by first adding part of the requisite amount of acid to the aqueous polyvinyl alcohol solution, with the remaining amount of the acid being added to the solution together with the vanadium compound. Thus, by routine experimentation, practitioners of the art may predetermine and precisely control the length of time during which the aqueous polyvinyl alcohol solution containing the vanadium compound remains fluid, prior to the onset of rapid gelation.

Consequently, this invention provides practitioners of the art with a surprisingly new technique for gelation of aqueous polyvinyl alcohol solutions which permits the gelation agent to be mixed into a polyvinyl alcohol solution which then remains completely fluid for sufficient time to permit flowing, spraying, doctoring, or otherwise applying the solution onto a surface, or generation of a foam which can then be flowed or otherwise placed into position, but which then is very rapidly converted into a firm gelled structure, without any further treatment.

It is critical to this invention that a vanadium compound be used wherein the vanadium has the valence state of $+5$, since vanadium compounds wherein the vanadium is in other valence states, such as $+4$ or $+3$, do not provide the surprising time controlled gelation attained by the present invention. The starting vanadium compounds used in this invention preferably are vanadate salts (the term "vanadate" being defined to be implicitly restricted to ions wherein the vanadium has the valence state of $+5$), such as ammonium vanadate, sodium vanadate, potassium vanadate, and the like.

To insure intimate contact of the vanadium compound throughout the polyvinyl alcohol solution, it is necessary for this compound to be solution-soluble at least to the extent necessary to effect the subsequent gelation as explained below. That is, this vanadium compound must be soluble in the particular aqueous polyvinyl alcohol solution which is to be gelled, which contains an acid or acid salt to obtain the critical pH, and which may also contain other ingredients. The terms "solution-soluble" and "soluble" as used herein in accordance with standard art-recognized terminology, refer to both true solutions and colloidal solutions, since the essential requirement is intimate contact throughout the polyvinyl alcohol solution, which may be accomplished by either a true solution or a colloidal solution.

Any organic or inorganic acid or acid salt which does not adversely react with either the polyvinyl alcohol or vanadium compound, may be used to adjust the pH of the aqueous solution to the critical range. Preferably, a strong acid such as hydrochloric acid, sulfuric acid and the like, is used since excessive amounts of relatively weak acids, such as acetic acid, are required to obtain the critical pH of about 2 or less.

In the practice of this invention, the vanadium compound should be added to the polyvinyl alcohol in an amount effective to cause subsequent gelation of the aqueous polyvinyl alcohol solution. The precise lower limit of the concentration of the vanadium compound depends primarily upon the particular type of polyvinyl alcohol used, the concentration of the polyvinyl alcohol in the aqueous solution, and the strength or firmness of the ultimate gel which is desired. Generally, the vanadium compound must be used in an amount equivalent to at least about $1 \times 10^{-4}$ gram atom of vanadium per gram of polyvinyl alcohol, and in most instances, it is preferred to use the vanadium compound in an amount equivalent to at least about $2 \times 10^{-4}$ gram atom of vanadium per gram of polyvinyl alcohol. There is no actual critical upper limit on the concentration of the starting vanadium compound. It should be noted that the strength or firmness of the gel is directly proportional to the amount of vanadium ions present which crosslinks the polyvinyl alcohol, and large excess amounts of the vanadium compound may cause a shrinkage of the resulting gel, which can squeeze water out of the gel. In many instances this result is immaterial; but where such a result is undesirable, the practitioner of the art may determine by routine experimentation, the operable upper concentration of the vanadium compound.

This invention is further illustrated by the following examples. The mixing apparatus used in these examples consisted of two hypodermic syringes mounted adjacent to a vertical rod fitted with a sliding collar, arranged so that pressure on the collar forces liquids simultaneously from the syringes, and thence into a capillary T wherein the two liquids are mixed, and thence into a test tube. One of these syringes delivered two parts (by volume) of polyvinyl alcohol solution and the other syringe delivered one part of a solution of an agent as indicated. Except as noted, the polyvinyl alcohol solution used was a 4.5 weight percent aqueous solution of a commercially available, high molecular weight, fully hydrolyzed polyvinyl alcohol, having a 4% aqueous solution viscosity of 55–65 centipoises. In these examples, percentages are expressed in terms of percent by weight.

*Example 1*

Two parts of the aqueous polyvinyl alcohol solution were mixed with one part of an aqueous solution containing 0.3% by weight of ammonium vanadate (providing $2.85 \times 10^{-4}$ gram atoms of vanadium per gram of polyvinyl alcohol) and 0.29% by weight of hydrochloric acid. The mixture was clear, bright yellow, and very fluid after mixing, but gelled firmly in 5 to 10 seconds. The pH observed immediately on mixing was 1.7. After 2 minutes the pH was 2.15.

*Example 2*

This example illustrates one manner by which the time delay after mixing the components, before the onset of gelation, may be increased. Two parts of a solution consisting of 10 ml. of the aqueous polyvinyl alcohol solution and 0.1 ml. of 5.8% (by weight) hydrochloric acid, were mixed with one part of an aqueous solution containing 0.3% by weight of ammonium vanadate (providing $2.88 \times 10^{-4}$ gram atoms of vanadium per gram of polyvinyl alcohol) and 0.17% hydrochloric acid. The mixture was clear, bright yellow, and very fluid after mixing. A loose gel formed after 1 minute which became firm after about 2 minutes. The mixture had an immediate pH of 1.9, which changed to 2.0 on standing.

*Example 3*

This example further illustrates how the time delay during which the solution remains fluid after mixing of the components, before the onset of gelation, may be controlled. In this example, the components were mixed as described above. In Tests 1 and 4 of this example all of the acid used in the mixture was premixed with the aqueous polyvinyl alcohol solution which was then mixed with the ammonium vanadate solution. In the other tests, part of the acid was premixed with the aqueous polyvinyl alcohol solution and the remainder of the acid was premixed with the ammonium vanadate solution, and thereafter, the two solutions were then mixed together. The polyvinyl alcohol used was the same as used in the preceding examples; however, the aqueous polyvinyl alcohol solutions were mixed to about 3% by weight concentrations thereof. Ammonium vanadate was used in all tests. The results of this example are shown in the following table, wherein percentages of ammonium vanadate and acid are based on the weight of polyvinyl alcohol:

| Test No. | Wt. Percent Vanadate | Acid | Wt. Percent Acid | Wt. Percent of total acid in PVA solution | Gel time (minutes) | Initial pH | Approximate final pH |
|---|---|---|---|---|---|---|---|
| 1 | 3.3 | HCl | 3.2 | 100 | 1.5-2 | 1.2 | 2.1 |
| 2 | 3.3 | HCl | 3.2 | 40 | 1-2 | 1.9 | 2.0 |
| 3 | 3.3 | HCl | 3.8 | 33 | 0.4 | 1.7 | 2.1 |
| 4 | 3.3 | H₂SO₄ | 8.4 | 100 | 2.5 | 2.1 | 1.9 |
| 5 | 3.3 | H₂SO₄ | 6.3 | 67 | 4-5 | 2.0 | 2.0 |
| 6 | 3.3 | H₂SO₄ | 7.4 | 44 | 0.5-1 | 1.7 | 2.0 |

I claim:
1. The process of preparing an aqueous polyvinyl alcohol solution which remains fluid for at least a few seconds after preparation and spontaneously gels thereafter, which process consists essentially of contacting a gelable fluid aqueous polyvinyl alcohol solution at a pH of not more than about 2 with a pentavalent vanadium compound dissoluble therein to provide at least about $1 \times 10^{-4}$ gram atom of pentavalent vanadium per gram of polyvinyl alcohol.
2. Process according to claim 1 wherein said vanadium compound is a vanadate salt.
3. Process according to claim 2 wherein said vanadate salt is ammonium vanadate.

References Cited by the Examiner

UNITED STATES PATENTS 2,125,374   8/1938   Herrmann et al. _____ 117—118

FOREIGN PATENTS 886,467   10/1943   France.

MURRAY TILLMAN, *Primary Examiner.*

W. J. BRIGGS, *Assistant Examiner.*